(12) United States Patent
Ramachandra Iyer

(10) Patent No.: US 10,990,761 B2
(45) Date of Patent: Apr. 27, 2021

(54) METHOD AND SYSTEM FOR PROVIDING MULTIMODAL CONTENT TO SELECTIVE USERS DURING VISUAL PRESENTATION

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 83 days.

(21) Appl. No.: 16/354,991

(22) Filed: Mar. 15, 2019

(65) Prior Publication Data
US 2020/0285703 A1 Sep. 10, 2020

(30) Foreign Application Priority Data
Mar. 7, 2019 (IN) .............................. 201941008870

(51) Int. Cl.
*G10L 15/22* (2006.01)
*G06F 40/30* (2020.01)
(Continued)

(52) U.S. Cl.
CPC ............ *G06F 40/30* (2020.01); *G06F 3/0484* (2013.01); *G06F 40/279* (2020.01);
(Continued)

(58) Field of Classification Search
CPC ......... G10L 13/00; G10L 13/02; G10L 13/08; G10L 15/1815; G10L 15/1822; G10L 15/183; G10L 15/22; G10L 15/26; G10L 21/06; G10L 15/265; G10L 19/167; G06N 3/006; G06N 5/022; G06N 5/041; H04N 21/4532; H04N 21/84; H04N 21/23; H04N 21/233; H04N 21/25833; H04N 21/2665; H04N 21/4122; H04N 21/42204;
(Continued)

(56) References Cited

U.S. PATENT DOCUMENTS 6,662,365 B1 * 12/2003 Sullivan ............... H04N 5/4401
348/E5.105
6,732,367 B1 * 5/2004 Ellis ................... H04N 5/44543
348/E5.105
(Continued)

*Primary Examiner* — Vijay B Chawan
(74) *Attorney, Agent, or Firm* — Finnegan, Henderson, Farabow, Garrett & Dunner, LLP

(57) ABSTRACT

The present disclosure discloses method and a content rendering system for providing multimodal content to selective users during visual presentation. The method includes identifying plurality of users attending visual presentation based on login and user details provided during registering to visual presentation. One or more keywords is determined in visual presentation associated with one or more auxiliary content based on narration by a presenter. The one or more auxiliary content corresponding to each of the one or more keywords is retrieved. The method includes identifying one or more users from plurality of users allowed to receive one or more auxiliary content based on user details and predefined auxiliary mapping details. The one or more auxiliary content is combined with corresponding one or more keywords in visual presentation. Thereafter, combined auxiliary content along with the visual presentation is provided to users in respective user devices.

13 Claims, 8 Drawing Sheets

(51) Int. Cl.
  *G06F 3/0484* (2013.01)
  *G06F 40/279* (2020.01)
  *G10L 15/18* (2013.01)
  *H04L 29/06* (2006.01)
(52) U.S. Cl.
  CPC .......... *G10L 15/1822* (2013.01); *G10L 15/22* (2013.01); *H04L 65/403* (2013.01)
(58) Field of Classification Search
  CPC ............... H04N 21/458; H04N 21/478; H04N 21/4782; H04N 21/4788; H04N 21/482; G06F 16/9537; G06F 16/9535; G06F 16/3329; G06F 15/3344; G06F 3/167; G06F 40/279; G06F 40/30
  USPC ....... 704/275, 231, 246, 247, 251, 252, 270, 704/270.1; 725/25, 27, 28, 30, 32, 39, 725/51, 56, 74, 85
  See application file for complete search history.

(56) References Cited

U.S. PATENT DOCUMENTS

| | | | | |
|---|---|---|---|---|
| 8,895,446 B2 * | 11/2014 | Peng | ................... | H01L 29/0649 438/700 |
| 8,942,986 B2 * | 1/2015 | Cheyer | ................... | G06N 5/022 704/275 |
| 9,420,328 B2 * | 8/2016 | Davis | ................... | H04N 21/478 |
| 9,548,050 B2 * | 1/2017 | Gruber | .............. | H04M 1/72597 |
| 9,799,082 B1 * | 10/2017 | Raskin | ................ | G06F 16/9535 |
| 10,706,841 B2 * | 7/2020 | Gruber | ................... | B60K 35/00 |
| 2002/0147752 A1 * | 10/2002 | Todoroki | ............... | G06F 17/147 708/402 |
| 2002/0147782 A1 | 10/2002 | Dimitrova et al. | | |
| 2010/0070529 A1 * | 3/2010 | Gokturk | ................ | G06Q 30/02 707/780 |
| 2011/0143811 A1 * | 6/2011 | Rodriguez | ......... | H04N 1/00127 455/556.1 |
| 2014/0059587 A1 * | 2/2014 | Davis | ............... | H04N 21/23418 725/32 |
| 2014/0168277 A1 * | 6/2014 | Ashley | ....................... | G06T 3/20 345/672 |
| 2014/0280179 A1 * | 9/2014 | Coleman | ............. | G06F 16/3323 707/740 |
| 2014/0373039 A1 * | 12/2014 | Davis | ................. | H04N 21/4753 725/25 |
| 2017/0308962 A1 * | 10/2017 | Raskin | ................ | G06F 16/3326 |
| 2018/0012309 A1 * | 1/2018 | Raskin | ................ | G06F 16/9535 |
| 2018/0158352 A1 * | 6/2018 | Chetlur | ................... | G10L 15/22 |
| 2018/0233028 A1 * | 8/2018 | Rhoads | ................ | G06F 16/9537 |
| 2020/0090659 A1 * | 3/2020 | Castelli | ................ | G06F 16/685 |

\* cited by examiner

| # | Keyword/theme | Users |
|---|---|---|
| 1 | Salary of CEO | Board of directors |
| 2 | Year on year profit | All |
| 3 | Department wise profit | Board of directors, department heads |
| 4 | Perks of CEO | Board of directors |
| 5 | Expense for refreshments | Shareholders, Board of directors |
| 6 | ... | |

| Auxiliary content ID | Consumer type | Users consuming the content |
|---|---|---|
| A1 | Finance background | +1 000000000 |
| A1, A3 | Executive | |
| A4 | Adult | |
| Figure or a table from the normal content from a previous screen | All | |

Fig.2d

METHOD AND SYSTEM FOR PROVIDING MULTIMODAL CONTENT TO SELECTIVE USERS DURING VISUAL PRESENTATION

TECHNICAL FIELD

The present subject matter is related in general to managing visual content, more particularly, but not exclusively to a method and system for providing multimodal content to selective users during visual presentation.

BACKGROUND

Nowadays, visual communication plays an important role in every meeting taking place in various organizations. Generally, presentation of common content to multiple class of users is challenging. During a course of presentation, some users may be interested in data, such as, numbers, while some others may be interested in pictures, graphs and the like. Thus, it becomes difficult to cater to multiple classes of users. In a common presentation, sometimes, some data may be sensitive, which is not required to be rendered to all users present in the presentation. For example, while presenting quarterly results of a company, an overall profit or loss is important for shareholders of the company, while department heads are interested in business unit wise profits relevant for their units, and interest of sales head lies in geographical distribution of sales of products. However, finance head is interested in quarter on quarter and year on year profits. In general, apart from common content, users who are part of the presentation are interested in different parts of the content.

Conventional systems provide an aspect of rendering additional content to specific users. However, in such conventional systems, each individual user is provided with a unique version due to which maintaining different user specific versions in a database becomes difficult and requires huge memory for storing these versions. Typically, the additional content is provided on a personal basis, which means, for each user, entire data streaming is personalized, and requires separate streaming as well as separate content generation and storage. Thus, resulting in utilization of more resources and bandwidth. Currently, there are no mechanisms to provide an auxiliary data which is a sensitive data to different users at different time-periods without need of maintaining customized data streams for each individual user.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for providing multimodal content to selective users during visual presentation. The method includes identifying a plurality of users attending the visual presentation being presented by a presenter based on login and user details provided during registering to the visual presentation. The method includes determining one or more keywords in the visual presentation associated with one or more auxiliary content in real-time based on narration by the presenter using Natural Language Processing (NLP) technique. Further, the one or more auxiliary content corresponding to each of the one or more keywords in the visual presentation is retrieved from a plurality of auxiliary content stored in a storage unit. Based on user details and predefined auxiliary mapping details, the method identifies one or more users from the plurality of users allowed to receive the one or more auxiliary content. Furthermore, the method includes combining the one or more auxiliary content with corresponding one or more keywords in the visual presentation and providing a combined auxiliary content along with the visual presentation to the one or more users in respective user devices.

In an embodiment, the present disclosure may relate to a content rendering system for providing multimodal content to selective users during visual presentation. The content rendering system may include a processor and a memory communicatively coupled to the processor, where the memory stores processor executable instructions, which, on execution, may cause the content rendering system to identify a plurality of users attending the visual presentation being presented by a presenter based on login and user details provided during registering to the visual presentation. The content rendering system determines one or more keywords in the visual presentation associated with one or more auxiliary content in real-time based on narration by the presenter using Natural Language Processing (NLP) technique. The one or more auxiliary content is retrieved corresponding to each of the one or more keywords in the visual presentation from a plurality of auxiliary content stored in a storage unit associated with the content rendering system. Further, the content rendering system identifies one or more users from the plurality of users allowed to receive the one or more auxiliary content based on the user details and predefined auxiliary mapping details. The one or more auxiliary content is combined with corresponding one or more keywords in the visual presentation. Thereafter, a combined auxiliary content along with the visual presentation is provided to the one or more users in respective user devices.

In an embodiment, the present disclosure relates to a non-transitory computer readable medium including instructions stored thereon that when processed by at least one processor may cause a content rendering system to identify a plurality of users attending the visual presentation being presented by a presenter based on login and user details provided during registering to the visual presentation. The instruction causes the processor to determine one or more keywords in the visual presentation associated with one or more auxiliary content in real-time based on narration by the presenter using Natural Language Processing (NLP) technique. The one or more auxiliary content is retrieved corresponding to each of the one or more keywords in the visual presentation from a plurality of auxiliary content stored in a storage unit associated with the content rendering system. Further, the instruction causes the processor to identify one or more users from the plurality of users allowed to receive the one or more auxiliary content based on the user details and predefined auxiliary mapping details. The one or more auxiliary content is combined with corresponding one or more keywords in the visual presentation. Thereafter, a combined auxiliary content along with the visual presentation is provided to the one or more users in respective user devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2d shows an exemplary auxiliary mapping details in accordance with some embodiments of the present disclosure;

Figure 1:
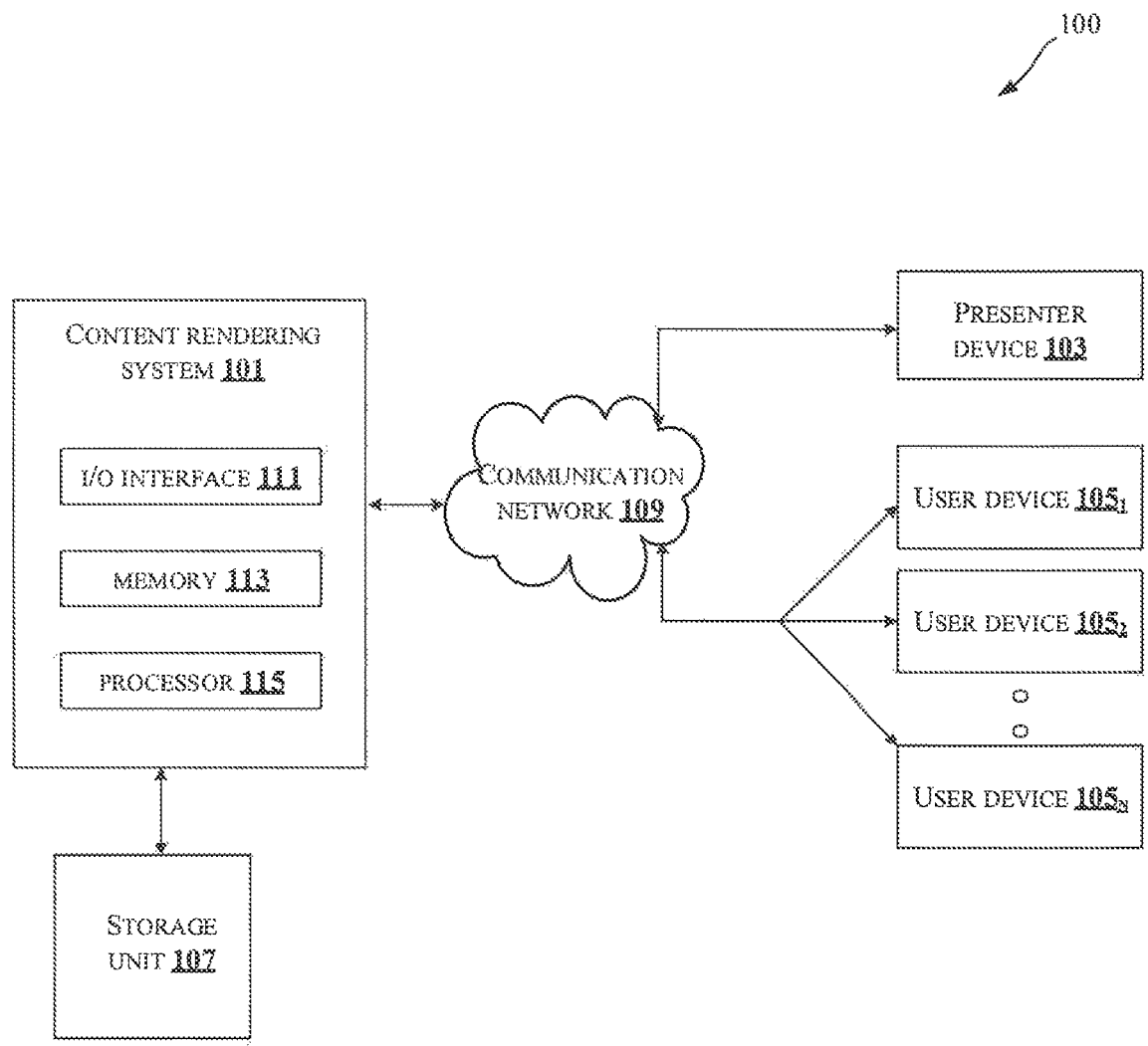
FIG. 1 illustrates an exemplary environment for providing multimodal content to selective users during visual presentation in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and a content rendering system for providing multimodal content to selective users during visual presentation. In an embodiment, visual presentation refers to communicating and sharing information in a dataset visually to users. Particularly, data to be presented in the presentation are fixed a priori, and choice of appropriate presentation technique depends largely on a presenter. Sometimes, the visual presentation may contain sensitive content specific to certain users which may not be possible to render in a common display device. Typically, in such cases, system may mask/blur the sensitive content and provide such content to specific users. However, this may provide an impression to other set of users, who may not be able to view the sensitive content, that some extra information is being rendered to specific users. Additionally, system may provide the sensitive content to users on personal basis by providing personalized streaming as well as generating a separate personalised content for each user associated with the sensitive content. The generation of the personalised content may result in wastage of resources. The present disclosure in such case may identify a plurality of users who are attending the visual presentation. Based on narration from the presenter one or more auxiliary content is identified and retrieved from a storage unit. Further, the present disclosure identifies one or more users from the plurality of users who may be allowed to view the one or more auxiliary content based on user details and predefined auxiliary mapping detail. Thereafter, a combined auxiliary content which may be overlaid with the visual presentation may be provided to the one or more users in respective user devices. In an embodiment, different types of auxiliary content may be rendered to different users simultaneously at same place. The present disclosure renders additional content for specific users in real-time with same visual presentation.

FIG. 1 illustrates an exemplary environment for providing multimodal content to selective users during visual presentation in accordance with some embodiments of the present disclosure.

As shown in FIG. 1, an environment 100 includes a content rendering system 101 connected through a communication network 109 to a presenter device 103 and a user device $105_1$, a user device $105_2$, to a user device 105N (collectively referred as plurality of user devices 105). Further, the content rendering system 101 may also be connected to a storage unit 107. In an embodiment, the presenter device 103 may be associated with a presenter (not shown explicitly in FIG. 1). In an embodiment, the presenter may refer to, but not limited to, a user who may deliver a visual presentation to one or more users attending the presentation. In an embodiment, the visual presentation may be related to any domain such as, product demonstration, advertisement, corporate presentations, news briefings, interactive tutorial delivery and the like, based on type of organization. In an embodiment, the presenter device 103 may include, but is not limited to, a laptop, a desktop computer, a Personal Digital Assistant (PDA), a notebook, a smartphone, IOT devices, a tablet, a server, and any other computing devices. A person skilled in the art would understand that, any other devices, not mentioned explicitly, may also be used as the presenter device 103 in the present disclosure. In an embodiment, the presenter device 103 may be associated with one or more voice sensors such as, microphones and pointing devices which may be used for highlighting specific location in the visual presentation. In an embodiment, the plurality of user devices 105 may be associated with audience or users who may be attending the visual presentation. The users may vary based on the type of organization.

For instance, the users may include employees, directors, business heads of organization, press, students, retail customers and the like based on context of the visual presentation. In an embodiment, the plurality of user devices 105 may include, but is not limited to, a laptop, a desktop computer, a Personal Digital Assistant (PDA), a notebook, a smartphone, IOT devices, a tablet and any other computing devices. A person skilled in the art would understand that, any other devices, not mentioned explicitly, may also be used as the plurality of user devices 105 in the present disclosure. The content rendering system 101 may render content to selective users during the visual presentation. In an embodiment, the visual presentation refers to communicating and sharing information in a dataset visually to users. In an embodiment, the content rendering system 101 may exchange data with other components and service providers (not shown explicitly in FIG. 1) using the communication network 109.

The communication network 109 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. In one embodiment, the content rendering system 101 may include, but is not limited to, a laptop, a desktop computer, a Personal Digital Assistant (PDA), a notebook, a smartphone, IOT devices, a tablet, a server, and any other computing devices. A person skilled in the art would understand that, any other devices, not mentioned explicitly, may also be used as the content rendering system 101 in the present disclosure. Further, the content rendering system 101 may include an I/O interface 111, a memory 113 and a processor 115. The I/O interface 111 may be configured to receive the visual presentation by the presenter from the presenter device 103.

The visual presentation received from the I/O interface 111 may be stored in the memory 113. The memory 113 may be communicatively coupled to the processor 115 of the content rendering system 101. The memory 113 may also store processor instructions which may cause the processor 115 to execute the instructions for providing multimodal content to selective users during visual presentation.

Considering a visual presentation being presented by the presenter associated with the presenter device 103. Initially, the content rendering system 101 may receive the visual presentation from the presenter device 103. While attending the visual presentation, the users associated with the plurality of user devices 105 may register to the presentation by providing login and user details. Thus, on receiving the visual presentation, the content rendering system 101 may identity a plurality of users who may be attending the visual presentation and associated with the plurality of user devices 105 based on the login and user details.

In an embodiment, the login details may be recognized along with user device identification number. In an embodiment, the user details may be retrieved based on the login details from the storage unit 107. The user details may include, but not limited to, designation of a user, contact number, email identification, working domain, years of experience and device number. As the presenter associated with the presenter device 103 narrates the visual presentation, the content rendering system 101 may determine one or more keywords in the visual presentation which may be associated with one or more auxiliary content using Natural Language Processing (NLP) technique.

In an embodiment, the one or more auxiliary content may refer to a user/role specific content associated with a main content which may be rendered to specific users. Particularly, the content rendering system 101 using the NLP technique may identify what the presenter associated with the presenter device 103 narrates. For example, consider the presenter utters, "this year our company made profit of 20 million dollars". In such case, the content rendering system 101 may determine the one or more keywords as 'this' 'year' 'our' 'company' 'profit' '20 million' and 'dollars'. In an embodiment, the one or more keywords may match with content containing sentence "profit of the company: 20 million USD". The content rendering system 101 may match each of the one or more keywords identified from the narration of the presenter with a plurality of auxiliary content stored in the storage unit 107.

Further, the content rendering system 101 may retrieve the one or more auxiliary content which corresponds to each of the one or more keywords in the visual presentation from a plurality of auxiliary content stored in the storage unit 107. In an embodiment, the plurality of auxiliary content is generated previously based on predetermined parameters which may include, but not limited to, impact to competitors and sensitive content associated with the one or more keywords. The one or more auxiliary content retrieved from the storage unit 107 may be specific to certain users. Thus, the content rendering system 101 may identify one or more users from the plurality of users associated with the user devices 105 who may be allowed to receive the one or more auxiliary content. In an embodiment, the one or more users may be identified based on the user details and predefined auxiliary mapping details. In an embodiment, the predefined auxiliary mapping details may include the plurality of auxiliary content mapped with corresponding one or more users allowed for viewing the corresponding auxiliary content.

Further, the content rendering system 101 may combine the one or more auxiliary content with corresponding one or more keywords in the visual presentation. In an embodiment, the one or more auxiliary content is combined with corresponding one or more keywords by scaling the one or more auxiliary content associated with the one or more keywords on a display used by the presenter based on coordinates details of the display. On identifying the one or more users, the content rendering system 101 may generate an alert for the one or more users for notifying availability of the one or more auxiliary content. In an embodiment, the alert may be indicated over a message or vibration or a pop-up notification on respective user device of the plurality of user devices 105. In an embodiment, different users may be alerted at different times depending on the one or more auxiliary content. Once the alert is generated and user accepts the alert, the content rendering system 101 may provide a combined auxiliary content along with the visual presentation to the one or more users associated with the plurality of user devices 105 in respective user device.

Figure 2A:
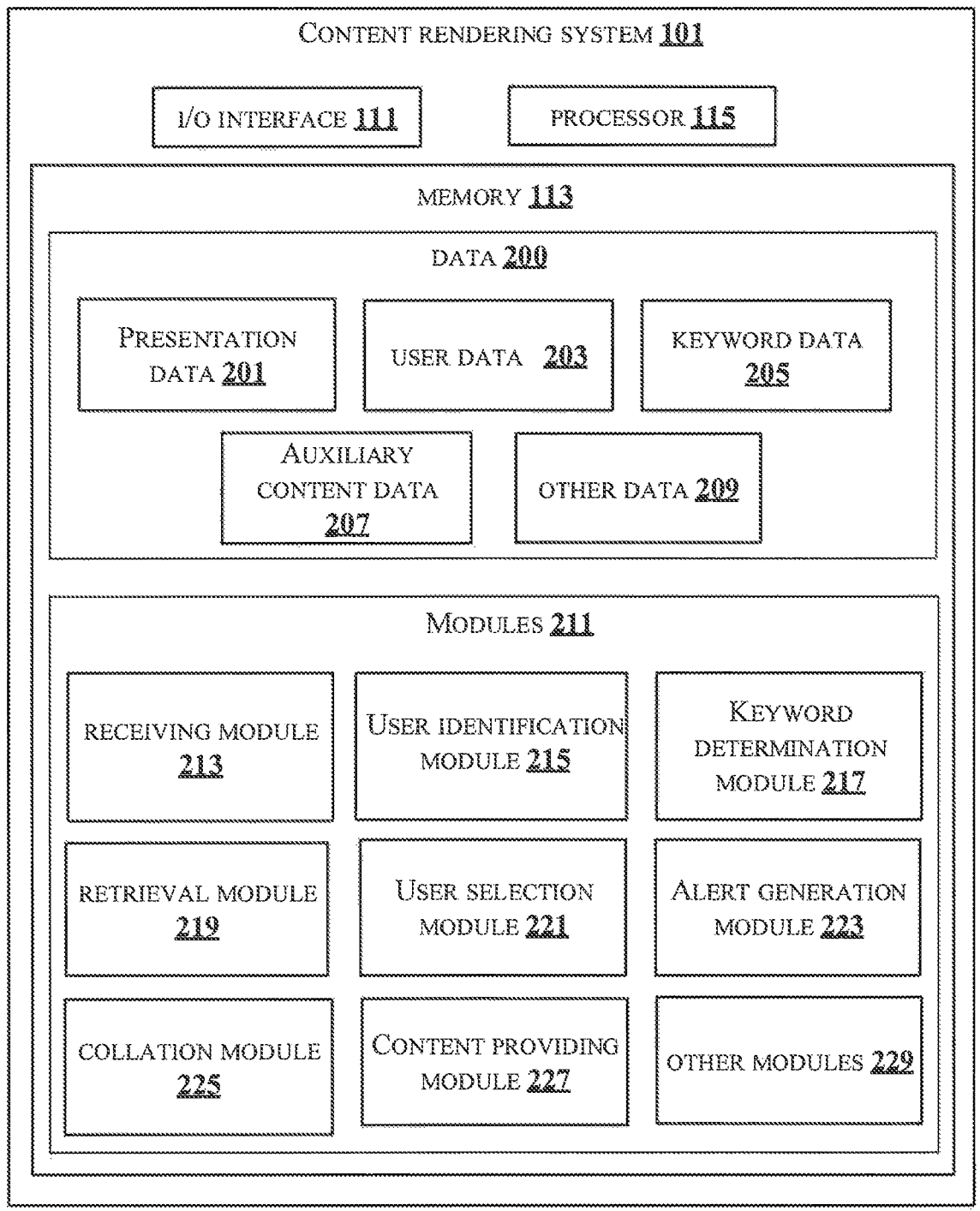
FIG. 2a shows a detailed block diagram of a content rendering system in accordance with some embodiments of the present disclosure.

FIG. 2a shows a detailed block diagram of a content rendering system in accordance with some embodiments of the present disclosure.

The content rendering system 101 may include data 200 and one or more modules 211 which are described herein in detail. In an embodiment, data 200 may be stored within the memory 113. The data 200 may include, for example, presentation data 201, user data 203, keyword data 205, auxiliary content data 207 and other data 209.

The presentation data 201 may include the visual presentation received from the presenter device 103. The visual presentation may include for example, text, image, numbers and the like. In an embodiment, the visual presentation may be associated with one or more auxiliary content.

The user data 203 may include details regarding login credentials, contact number of user, type of user device, designation of a user, email identification, working domain, year of experience and device number. A person skilled in the art would understand that any other user details not mentioned explicitly herein may also be considered in the present disclosure.

The keyword data 205 may include the one or more keywords identified from the narration by the presenter from the visual presentation. In an embodiment, the one or more keywords may be associated with the one or more auxiliary content. In an embodiment, the one or more keywords may be identified using the NLP technique. A person skilled in the art would understand that any other technique for identifying the one or more keywords, not mentioned herein may also be used in the present disclosure.

The auxiliary content data 207 may include the plurality of auxiliary content generated for the visual presentation. In an embodiment, the plurality of auxiliary content may also be stored in the storage unit 107.

The other data 209 may store data, including temporary data and temporary files, generated by modules 211 for performing the various functions of the content rendering system 101.

In an embodiment, the data 200 in the memory 113 are processed by the one or more modules 211 present within the memory 113 of the content rendering system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the content rendering system 101. The said modules 211 when configured with the functionality defined in the present disclosure will result in a novel hardware.

In one implementation, the one or more modules 211 may include, but are not limited to a receiving module 213, a user identification module 215, a keyword determination module 217, a retrieval module 219, a user selection module 221, an alert generation module 223, a collation module 225 and a content providing module 227. The one or more modules 211 may also include other modules 229 to perform various miscellaneous functionalities of content rendering system 101. In an embodiment, the other modules 229 may include an NLP engine for capturing the narration of the presenter. Further, the other modules 229 may include an auxiliary content generation module.

The auxiliary content generation module may segregate content to be presented in the visual presentation and the one or more auxiliary content. In an embodiment, the content is dynamically segregated into visual presentation and the one or more auxiliary content based on a plurality of parameters such as, impact to competitors and sensitive content associated with the one or more keywords and domains. In an embodiment, the one or more auxiliary content associated with one or more keywords may be allowed to be viewed by or more users from the plurality of users. In an embodiment, the auxiliary content generation module may segregate the visual presentation based on what is rendered over the display screen at a given point of time. The auxiliary content generation module may generate the plurality of auxiliary content based on sensitivity of the content in the visual presentation. For example, domains such as, religion, political affiliations, salary or profit break up and the like are considered as highly sensitive content. On other hand, consolidated range of same may be considered as moderately sensitive. The auxiliary content generation module may generate a table of the one or more keywords which may be associated with the auxiliary content and one or more users associated with such auxiliary content. Alternatively, the table may be generated by an expert. An exemplary list of keywords associated with one or more users is illustrated as a table in FIG. 2c.

The receiving module 213 may receive the visual presentation to be presented by the presenter from the presenter device 103. The receiving module 213 may receive data captured from the presenter device 103 which includes utterance of the presenter, focus of the pointing device on a display screen and the like. Further, the receiving module 213 may also receive the login and user details from the plurality of user devices 105 for registering to the visual presentation.

The user identification module 215 may identify the plurality of users attending the visual presentation and associated with the plurality of user devices 105. The user identification module 215 may identify the plurality of users based on the login and user details which may be provided during registration. In an embodiment, the user details may include designation of the user, contact number, email identification, working domain, years of experience and device number. In an embodiment, the user details may be retrieved from the memory 113. In an embodiment, the user identification module 215 may map the contact number and the device number to one or more class of users, such as department head, board of director and the like based on the type of users associated with the visual presentation.

The user details may be helpful to dispatch right type of content. For example, if one of the user is a patent engineer, more details such as, year wise and domain wise patents generated by the company may be right type of content for the patent engineer. In an embodiment, the user details may be checked online or by querying the user, in case the user details are not stored in the memory 113 and not available through the registration. The user identification module 215 may identify different types of users registered for the visual presentation. For example, if the visual presentation is for a company, the different users attending an internal visual presentation may be board of directors, shareholders, department heads and the like.

The keyword determination module 217 may determine the one or more keywords in the visual presentation which may be associated with the one or more auxiliary content based on the narration by the presenter using the NLP technique. In an embodiment, the NLP module as described above may identify narration of the presenter. For example, consider, the presenter utters, "this year our company made profit of 20 million dollars". In such case, the keyword determination module 217 may determine the keywords as, 'this' 'year' 'our' 'company' 'profit' '20 million' and 'dollars'. The keyword determination module 217 after determining the one or more keywords may match each of the one or more keywords with the plurality of auxiliary content. For instance, in the above example, the one or more keywords such as, this' 'year' 'our' 'company' 'profit' '20 million' and 'dollars' may match with the content containing the sentence "profit of the company: 20 million USD".

Thus, the keyword determination module 217 may determine the keywords may be associated with the one or more auxiliary content of department wise profit. In an embodiment, the presenter may speak with the pointing or highlighting device. The movement of highlighted area may determine the one or more keywords associated with the one or more auxiliary content. In an embodiment, the keyword determination module 217 may determine if all points or objects depicted over the display screen is narrated by the presenter and conversely if all relevant auxiliary content is triggered.

The retrieval module 219 may retrieve the one or more auxiliary content corresponding to each of the one or more keywords in the visual presentation from the plurality of auxiliary content. In an embodiment, the one or more auxiliary content to be retrieved may be dependent on narration of the presenter, content associated with the region of highlight from the pointing device and the like. In an embodiment, the one or more auxiliary content is grouped based on common heading, figure, table, paragraph to form non-overlapping regions.

Figures 2B, 2C:
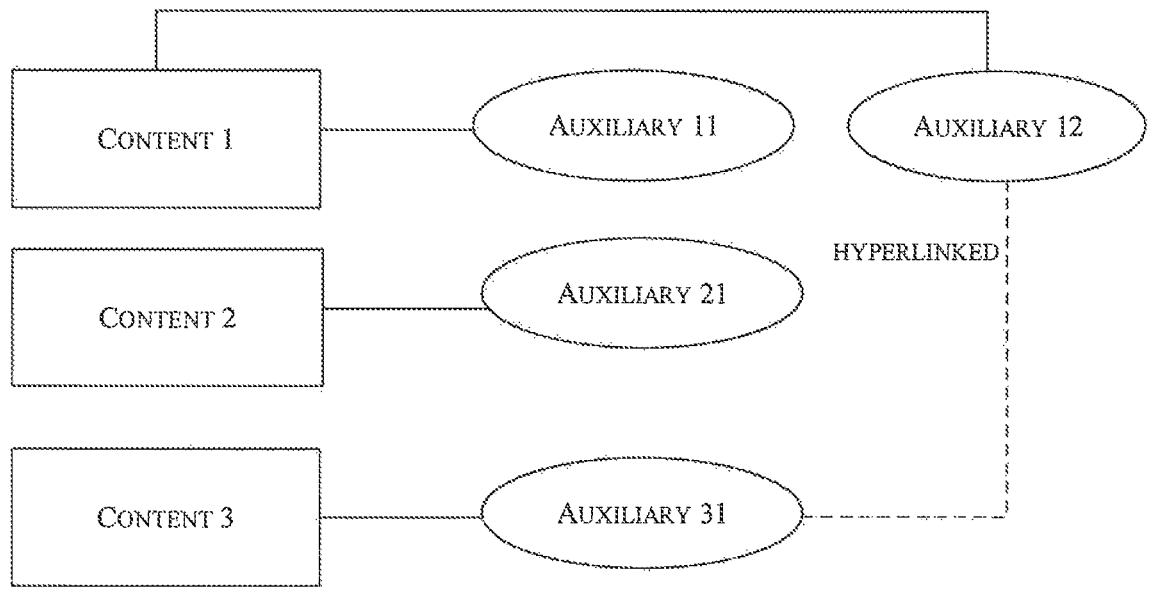
FIG. 2b shows an exemplary embodiment of association of content and auxiliary content in accordance with some embodiments of the present disclosure.
FIG. 2c shows an exemplary list of keywords associated with one or more users in accordance with some embodiments of the present disclosure.

In an embodiment, the plurality of auxiliary content may include a text, image, figure, a table and the like. In one implementation, the one or more auxiliary content may be hyperlinked to previous auxiliary content in case of commonality. FIG. 2b shows an exemplary embodiment of association of content and auxiliary content in accordance with some embodiments of the present disclosure. As shown in FIG. 2b, content 1, content 2 and content 3 is associated with auxiliary content 11 and auxiliary content 12, auxiliary content 21 and auxiliary content 31 respectively. As shown in FIG. 2b, the auxiliary content 12 may also be associated with the content 3. Thus, the auxiliary content 12 is hyperlinked with auxiliary content 31.

Returning to FIG. 2a, the user selection module 221 may identify the one or more users from the plurality of users associated with the plurality of user devices 105 who may be allowed to receive the one or more auxiliary content retrieved by the retrieval module 219 for the one or more keywords. The user selection module 221 may identify the one or more users based on the user details and predefined auxiliary mapping details. In an embodiment, the predefined auxiliary mapping details may include the plurality of auxiliary content mapped with corresponding one or more users allowed for viewing the corresponding auxiliary content. An exemplary auxiliary mapping details is represented as a table in FIG. 2d.

In an embodiment, identity of the user may be utilized to identify who may consume the one or more auxiliary content. The identity may be identified based on login credentials, user domain such as, finance, engineering, operations and the like. The Table-2 indicates the one or more auxiliary content and the one or more users associated with corresponding one or more auxiliary content. In an embodiment, sensitive user type such as, finance (money), religion, politics, military and the like may be identified from the login credentials. Eventually, the plurality of users may be mapped onto different categories of users such as, head of the division, board of director, auditor, finance controller and the like. In an embodiment, a scope of each login credential is predetermined. Particularly, a set of groups of users from the plurality of users with different degrees of sensitivity such as, high, low and medium may be predefined. The user selection module 221 may map each of the plurality of users with the set of groups. In an embodiment, a privileges for each of the groups may be predefined. For example, a breakup of profit of a company for each of department may fall under high sensitivity group. Alternatively, unwarranted additional information may be provided to competitors which may fall under low sensitivity group.

The alert generation module 223 may generate the alert for the one or more users associated with the one or more auxiliary content for notifying availability of the one or more auxiliary content. In an embodiment, the alert may be notified by sending a message or vibration or a pop-up notification on respective user devices.

In an embodiment, the alert generation module 223 may alert different users at different times depending on the identification of the one or more auxiliary content in real-time which may be associated with content being presented currently. In an embodiment, based on the notification, the one or more users may choose to accept or ignore the alert. In an embodiment, the presenter may also receive an alert whenever any of the one or more users is alerted. Thus, the presenter on receiving the alert may ensure a minimum predefined delay time before moving on to next content. For example, the predefined delay time may be one 10 seconds. In an embodiment, the alert generation module 223 may provide coordinates of the content which is currently narrated by the presenter.

The collation module 225 may combine the one or more auxiliary content with corresponding one or more keywords in the visual presentation. In an embodiment, the collation module 225 may blend the one or more auxiliary content with the visual presentation at right position. In an embodiment, a reference image of the display unit may be predefined. The collation module 225 may detect boundaries of the display unit. In an embodiment, the display unit may typically be distinguishable from background objects. In another embodiment, a rectangular object encircling multimedia content such as, a text or a running video or a figure or a table and the like is detected which may be identified as the reference image.

On identifying the reference image, the collation module 225 may scan the one or more auxiliary content with the reference image. In an embodiment, the reference image is standardized by experimentation and referred subsequently. In an embodiment, in some situations, the one or more auxiliary content may be a part of the figure. For example, in a political scenario, a visual presentation to public may be overall seats expected for liberals. However, for liberal leaders, regions within country in which a win is expected may be shown by the one or more auxiliary content as a figure. The regions in such case may be augmented for the image depicted over the respective liberal leaders. Further, the collation module 225 may refer to coordinates details of the user device in which the one or more auxiliary content is to be placed combined. In an embodiment, the one or more auxiliary content may be close to or connected with an arrow with the associated visual presentation.

The content providing module 227 may provide the combined auxiliary content along with the visual presentation to the one or more users in respective user devices. In an embodiment, the user devices apart from mentioned in FIG. 1, may include a head mount display, goggle and the like for receiving the one or more auxiliary content. In one embodiment, in case of security of the auxiliary content, the content providing module 227 may involve using an optic fibre or a flexible periscope to get image of screen in to the respective user devices without being peeped by any other users. In an embodiment, the content providing module 227 may delete the one or more auxiliary content provided to the one or more users immediately after rendering. In an embodiment, in case, if one or more users from the plurality of users may be attentive and responds to alerts generated by the alert generation module 223, the content providing module 227 may provide as a reward additional auxiliary content to such one or more users. In another embodiment, the one or more user may receive additional auxiliary content, in case the one or more users may find difficult to follow the visual presentation. In an embodiment, on providing the combined auxiliary content, the content providing module 227 may ensure no timing difference or distraction. In an embodiment, the content providing module 227 may shrink the screen view in respective user devices to accommodate the combined auxiliary content.

Figure 3A:
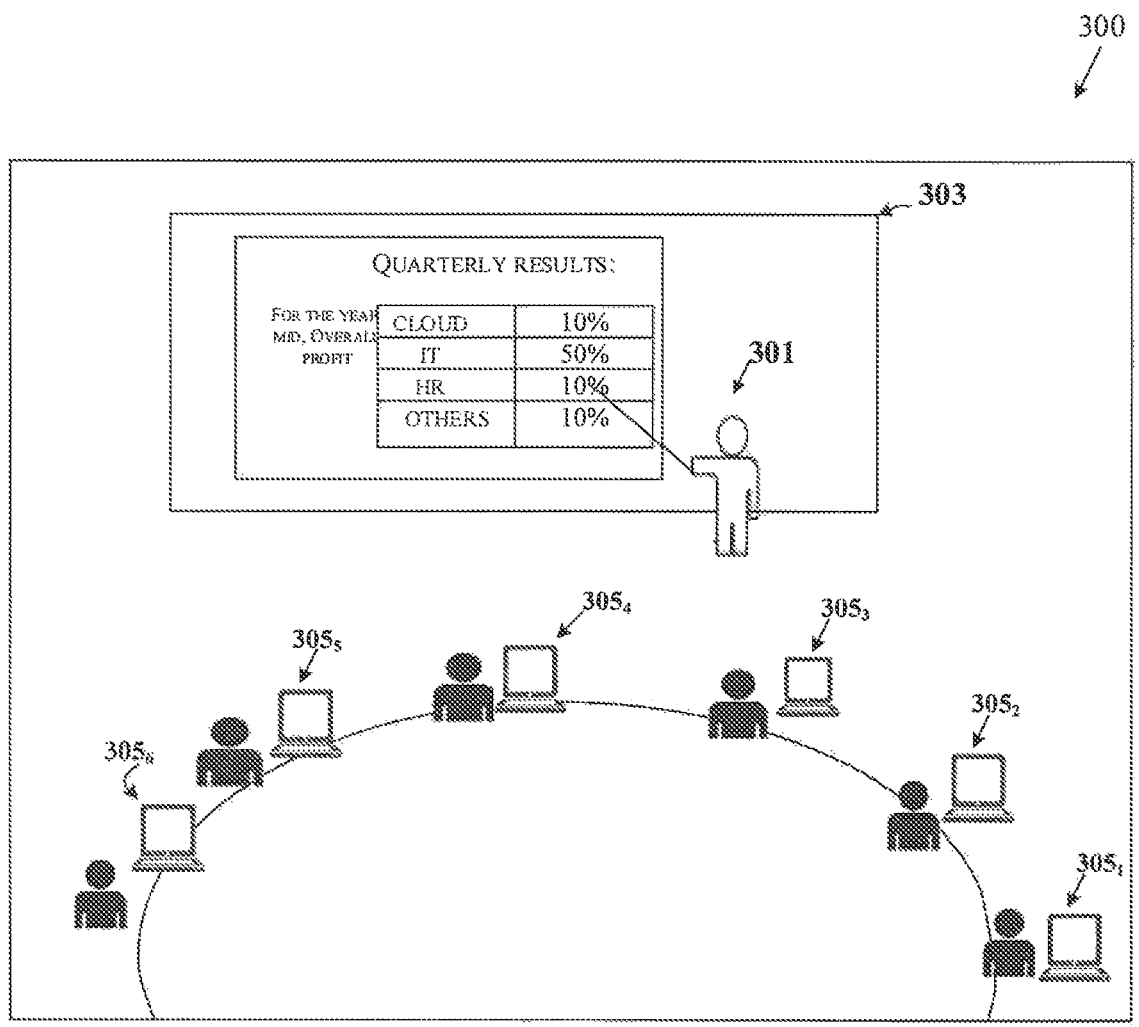
FIG. 3a and FIG. 3b illustrates an exemplary representation of presenting visual presentation for providing multimodal content to selective users in accordance with some embodiments of present disclosure.
Figure 3B:
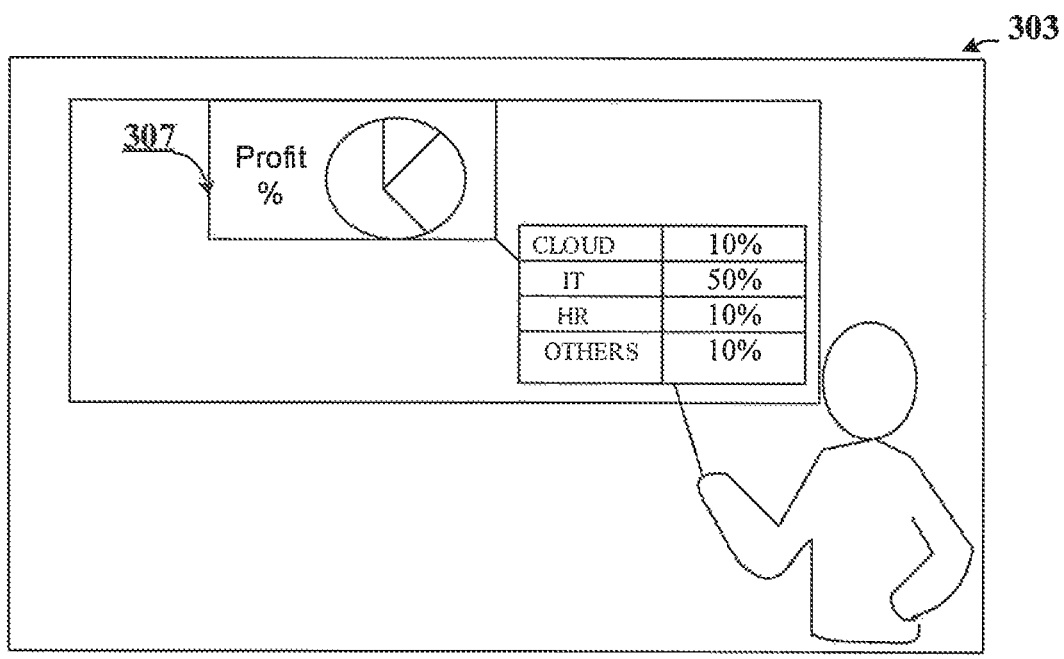

FIG. 3a and FIG. 3b illustrates an exemplary representation of presenting visual presentation for providing multimodal content to selective users in accordance with some embodiments of present disclosure.

Referring now to FIG. 3a, an exemplary representation 300 of a presentation scenario is illustrated. The presentation scenario includes a presenter 301 presenting a visual presentation, a display unit 303 for presenting the visual presentation and user devices ($305_1$-$305_6$), (referred as user devices 305) associated with users who may be attending the visual presentation. A person skilled in the art would understand the FIG. 3a is an exemplary representation and the user devices 305 may include the plurality of user devices. The presenter 301 may be associated with the presenter device (not shown explicitly in FIG. 3a). The presenter device and the user devices 305 may be connected to the content rendering system 101 (not shown explicitly in FIG. 3a). Consider, the presenter 301 is a corporate executive of a company and is authorized to present quarterly results of the company to the users associated with the user devices 305. In an embodiment, the users may include herein the board of directors, marketing and finance leaders of the company, employees and the press. The content rendering system 101 may receive the visual presentation from the presenter 301 and identifies the user devices 305 present for attending the visual presentation based on the login and user details shared while registering to the visual presentation.

As the presenter 301 narrates the visual presentation on overall profit, the content rendering system 101 may parse the narration and identify a keyword "overall profit" narrated by the presenter 301. Subsequently, based on the keyword, the content rendering system 101 may identify corresponding content on the display unit 303 about which the presenter 301 is narrating and retrieves the associated one or more auxiliary content. Further, the content rendering system 101 may identify one or more user device from the user devices 305 who may be associated with the one or more auxiliary content based on the user details and predefined auxiliary mapping details. In an embodiment, the predefined auxiliary mapping details may include the plurality of auxiliary content mapped with corresponding one or more users allowed for viewing the corresponding auxiliary content.

For instance, consider the user of user device $305_2$ and user of user device $305_6$ may be a person from board of director and a business unit head respectively. Thus, for the identified keyword, the "overall profit", the users of the user device $305_2$ and user device $305_6$ may be identified as the users associated with the one or more auxiliary content. Further, the content rendering system 101 may generate the alert to the user device $305_2$ and user device $305_6$ for rendering the one or more auxiliary content. In an embodiment, the one or more auxiliary content may be combined and augmented at right position in the display unit 303. For instance, the board of director associated with user device $305_2$ and the business unit head associated with user device $305_6$ may receive the one or more auxiliary content. FIG. 3b shows an exemplary representation of the combined auxiliary content. As shown in FIG. 3b, an auxiliary content 307 which is a graph depicting department-wise profit is rendered for user device $305_2$ and user device $305_6$. While, rest of the user device ($305_1$, $305_3$-$305_5$) may be allowed to view only consolidated profit.

Figure 4:
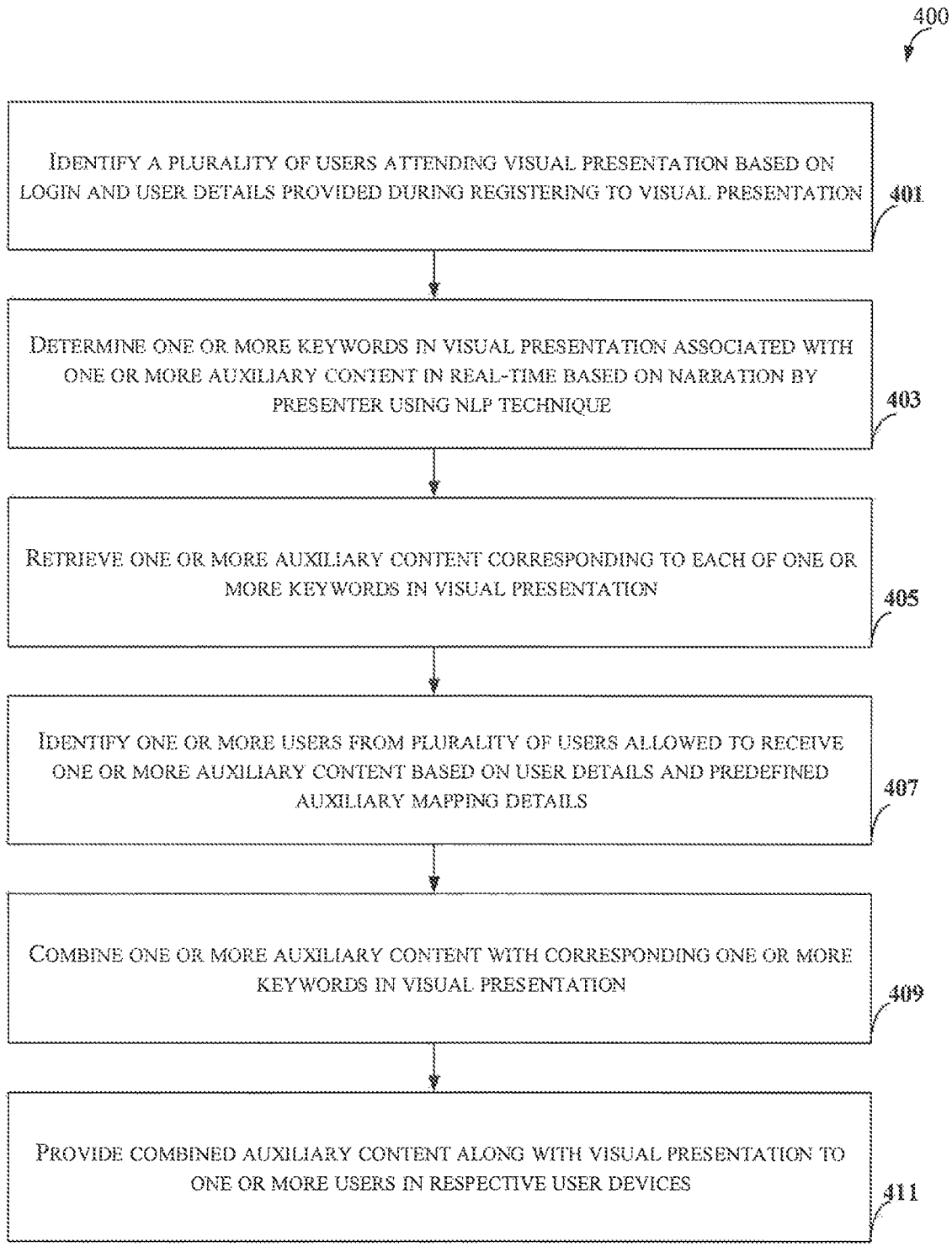
FIG. 4 illustrates a flowchart showing a method for providing multimodal content to selective users during visual presentation in accordance with some embodiments of present disclosure.

FIG. 4 illustrates a flowchart showing a method for providing multimodal content to selective users during visual presentation in accordance with some embodiments of present disclosure.

As illustrated in FIG. 4, the method 400 includes one or more blocks for providing multimodal content to selective users during visual presentation. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the plurality of users attending the visual presentation is identified by the user identification module 215 based on the login and user details provided during registering to the visual presentation.

At block 403, the one or more keywords is determined by keyword determination module 217 in the visual presentation associated with the one or more auxiliary content in real-time based on narration by the presenter using Natural Language Processing (NLP) technique.

At block 405, the one or more auxiliary content is retrieved by the retrieval module 219 corresponding to each of the one or more keywords in the visual presentation from the plurality of auxiliary content.

At block 407, the user selection module 221 may identify the one or more users from the plurality of users who may be allowed to receive the one or more auxiliary content based on the user details and predefined auxiliary mapping details. In an embodiment, on identification of the one or more users, the alert generation module 223 may generate the alert to the one or more users associated with the one or more auxiliary content.

At block 409, the one or more auxiliary content is combined by the collation module 225 with corresponding one or more keywords in the visual presentation.

At block 411, the combined auxiliary content along with the visual presentation is provided by the content providing module 227 to the one or more users in respective user devices.

Figure 5:
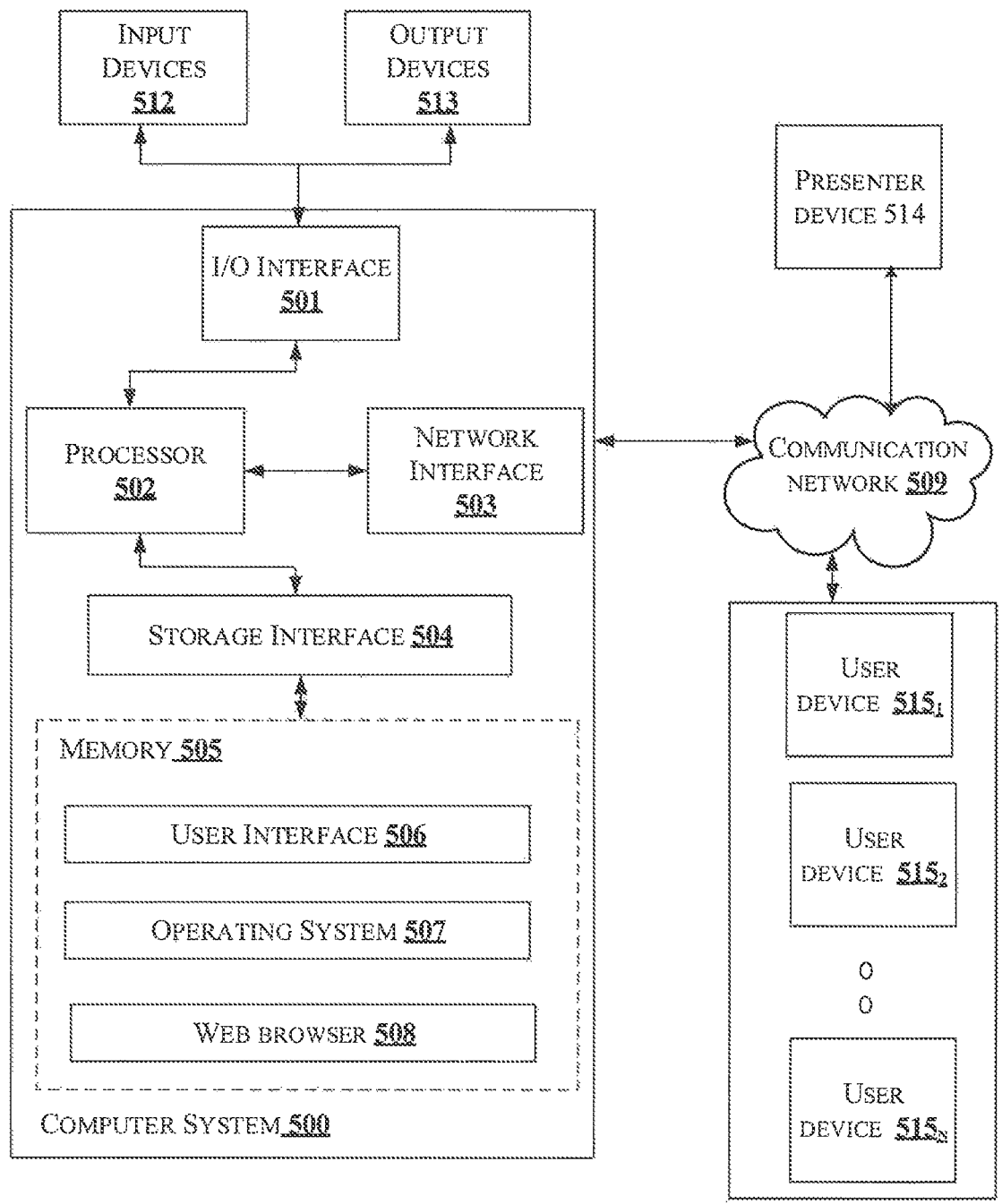
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the content rendering system 101. The computer system 500 may include a central processing unit ("CPU" or "processor") 502. The processor 502 may include at least one data processor for providing multimodal content to selective users during visual presentation. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the content rendering system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a presenter device 514 and a user device $515_1$ to a user device 515N (collectively referred as plurality of user devices 515). The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™ PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides one visual presentation with multiple views based on auxiliary content for one or more users.

An embodiment of present disclosure provides better understanding and synchronization of visual content.

An embodiment of the present disclosure provides easy method to attach or detach auxiliary content to original content.

An embodiment of the present disclosure ensures coherency between what is being uttered and what is being shown on the screen during presentation.

An embodiment of the present disclosure ensures if the presenter covered all content projected on to the screen.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
|---|---|
| Reference number | Description |
| 100 | Environment |
| 101 | Content rendering system |
| 103 | Plurality of user devices |
| 105 | Presenter device |
| 107 | Storage unit |
| 109 | Communication network |
| 111 | I/O interface |
| 113 | Memory |
| 115 | Processor |
| 200 | Data |
| 201 | Presenter data |
| 203 | User data |
| 205 | Keyword data |
| 207 | Auxiliary content data |
| 209 | Other data |
| 211 | Modules |
| 213 | Receiving module |
| 215 | User identification module |
| 217 | Keyword determination module |
| 219 | Retrieval module |
| 221 | User selection module |
| 223 | Alert generation module |
| 225 | Collation module |
| 227 | Content providing module |
| 229 | Other modules |
| 301 | Presenter |
| 303 | Display unit |
| 305 | User devices |
| 307 | Auxiliary content |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | Presenter device |
| 515 | Plurality of user devices |

What is claimed is:

1. A method of providing multimodal content to selective users during visual presentation, the method comprising:

identifying, by a content rendering system, a plurality of users attending the visual presentation being presented by a presenter based on login and user details provided during registering to the visual presentation;

determining, by the content rendering system, one or more keywords in the visual presentation associated with one or more auxiliary content in real-time based on narration by the presenter using Natural Language Processing (NLP) technique, wherein determining the one or more keywords associated with the one or more auxiliary content comprises matching each of the one or more keywords with the one or more auxiliary content stored in the storage unit;

retrieving, by the content rendering system, the one or more auxiliary content corresponding to each of the one or more keywords in the visual presentation from a plurality of auxiliary content stored in a storage unit associated with the content rendering system;

identifying, by the content rendering system, one or more users from the plurality of users allowed to receive the one or more auxiliary content based on the user details and predefined auxiliary mapping details;

combining, by the content rendering system, the one or more auxiliary content with corresponding one or more keywords in the visual presentation; and providing, by the content rendering system, a combined auxiliary content along with the visual presentation to the one or more users in respective user devices.

2. The method as claimed in claim 1, wherein the user details comprises designation of a user, contact number, email identification, working domain, years of experience and device number.

3. The method as claimed in claim 1, wherein the predefined auxiliary mapping details comprises the plurality of auxiliary content mapped with corresponding one or more users allowed for viewing the corresponding auxiliary content.

4. The method as claimed in claim 1, wherein the plurality of auxiliary content is generated based on predetermined parameters comprising impact to competitors and sensitive content associated with the one or more keywords.

5. The method as claimed in claim 1, wherein the one or more auxiliary content is combined with corresponding one or more keywords by scaling the one or more auxiliary content associated with the one or more keywords on a display used by the presenter based on coordinates details of the display.

6. The method as claimed in claim 1 further comprising generating an alert for the one or more users associated with the one or more auxiliary content for notifying availability of the one or more auxiliary content.

7. A content rendering system for providing multimodal content to selective users during visual presentation, comprising:

a processor; and a memory communicatively coupled to the processor, wherein the memory stores processor instructions, which, on execution, causes the processor to:

identify a plurality of users attending the visual presentation being presented by a presenter based on login and user details provided during registering to the visual presentation;

determine one or more keywords in the visual presentation associated with one or more auxiliary content in real-time based on narration by the presenter using Natural Language Processing (NLP) technique, wherein the processor determines the one or more keywords associated with the one or more auxiliary content by matching each of the one or more keywords with the one or more auxiliary content stored in the storage unit;

retrieve the one or more auxiliary content corresponding to each of the one or more keywords in the visual presentation from a plurality of auxiliary content stored in a storage unit associated with the content rendering system;

identify one or more users from the plurality of users allowed to receive the one or more auxiliary content based on the user details and predefined auxiliary mapping details;

combine the one or more auxiliary content with corresponding one or more keywords in the visual presentation; and provide a combined auxiliary content along with the visual presentation to the one or more users in respective user devices.

8. The content rendering system as claimed in claim 7, wherein the user details comprises designation of a user, contact number, email identification, working domain, years of experience and device number.

9. The content rendering system as claimed in claim 7, wherein the predefined auxiliary mapping details comprises the plurality of auxiliary content mapped with corresponding one or more users allowed for viewing the corresponding auxiliary content.

10. The content rendering system as claimed in claim 7, wherein the processor generates the plurality of auxiliary content based on predetermined parameters comprising impact to competitors and sensitive content associated with the one or more keywords.

11. The content rendering system as claimed in claim 7, wherein the processor combines the one or more auxiliary content with corresponding one or more keywords by scaling the one or more auxiliary content associated with the one or more keywords on a display used by the presenter based on coordinates details of the display.

12. The content rendering system as claimed in claim 7, wherein the processor generates an alert for the one or more users associated with the one or more auxiliary content for notifying availability of the one or more auxiliary content.

13. A non-transitory computer readable medium including instruction stored thereon that when processed by at least one processor cause a content rendering system to perform operation comprising:

identifying a plurality of users attending the visual presentation being presented by a presenter based on login and user details provided during registering to the visual presentation;

determining one or more keywords in the visual presentation associated with one or more auxiliary content in real-time based on narration by the presenter using Natural Language Processing (NLP) technique, wherein determining one or more keywords with the one or more auxiliary content further causes the processor to perform matching each of the one or more keywords with the one or more auxiliary content stored in the storage unit;

retrieving the one or more auxiliary content corresponding to each of the one or more keywords in the visual presentation from a plurality of auxiliary content stored in a storage unit associated with the content rendering system;

identifying one or more users from the plurality of users allowed to receive the one or more auxiliary content based on the user details and predefined auxiliary mapping details;

combining the one or more auxiliary content with corresponding one or more keywords in the visual presentation; and providing a combined auxiliary content along with the visual presentation to the one or more users in respective user devices.

\* \* \* \* \*